May 27, 1952  H. N. FISER  2,598,367
ROTARY HYDRAULIC COUPLING
Filed Nov. 10, 1948  4 Sheets-Sheet 3
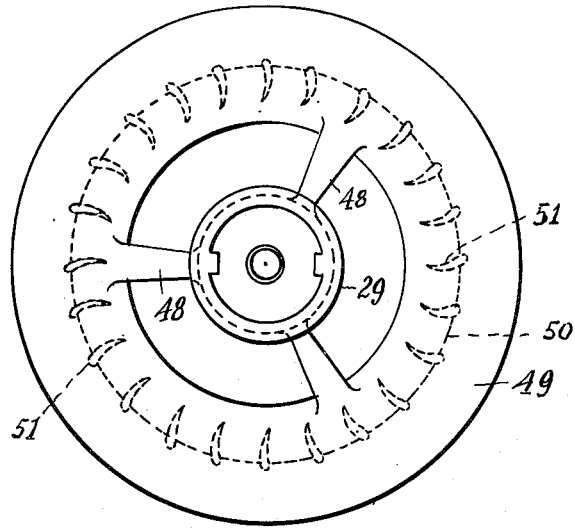
Fig. 7
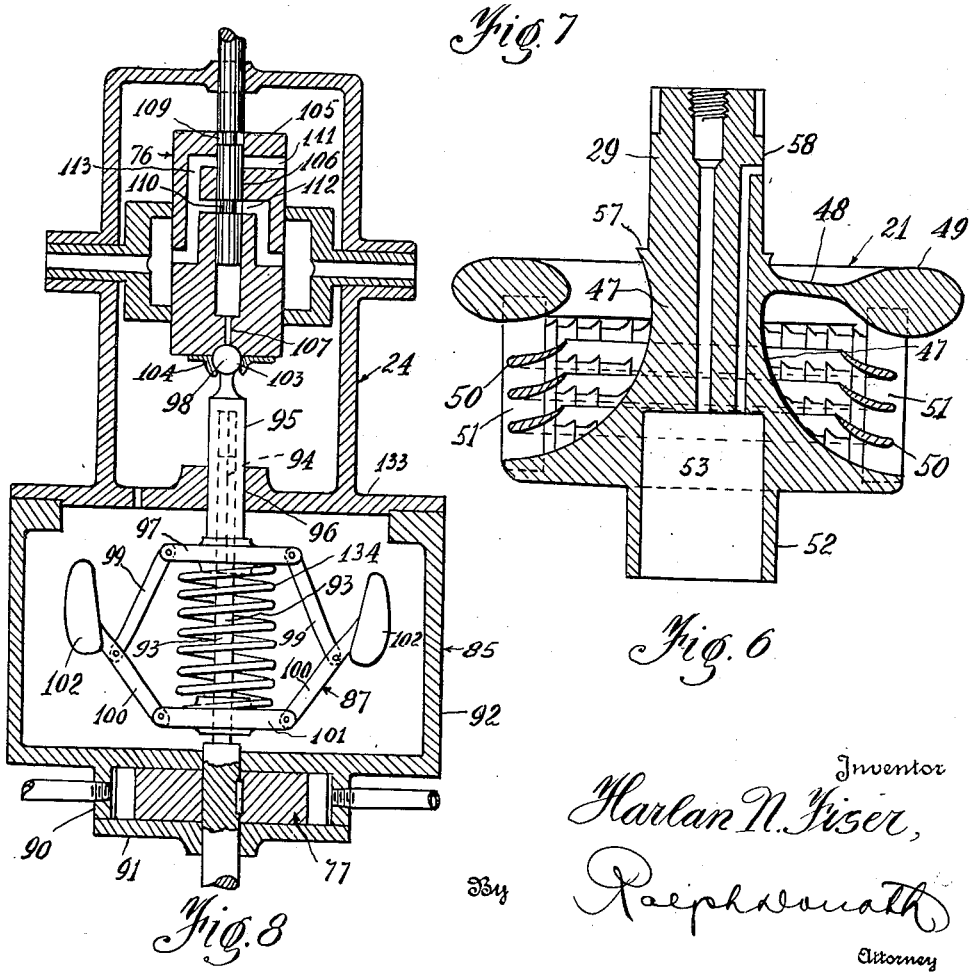
Fig. 8
Fig. 6
Inventor
Harlan N. Fiser,
By Ralph Donath
Attorney May 27, 1952 H. N. FISER 2,598,367
ROTARY HYDRAULIC COUPLING
Filed Nov. 10, 1948 4 Sheets-Sheet 4

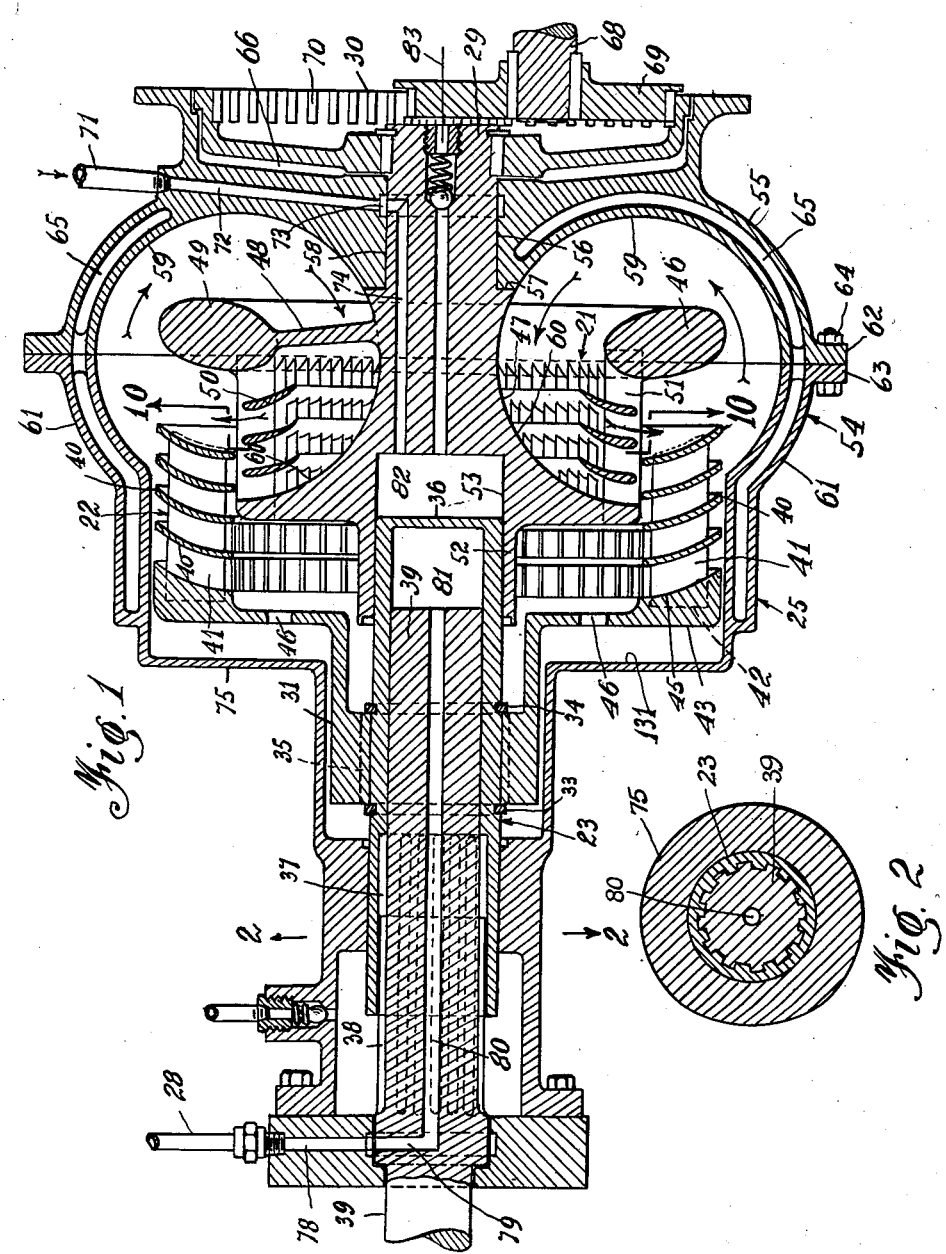

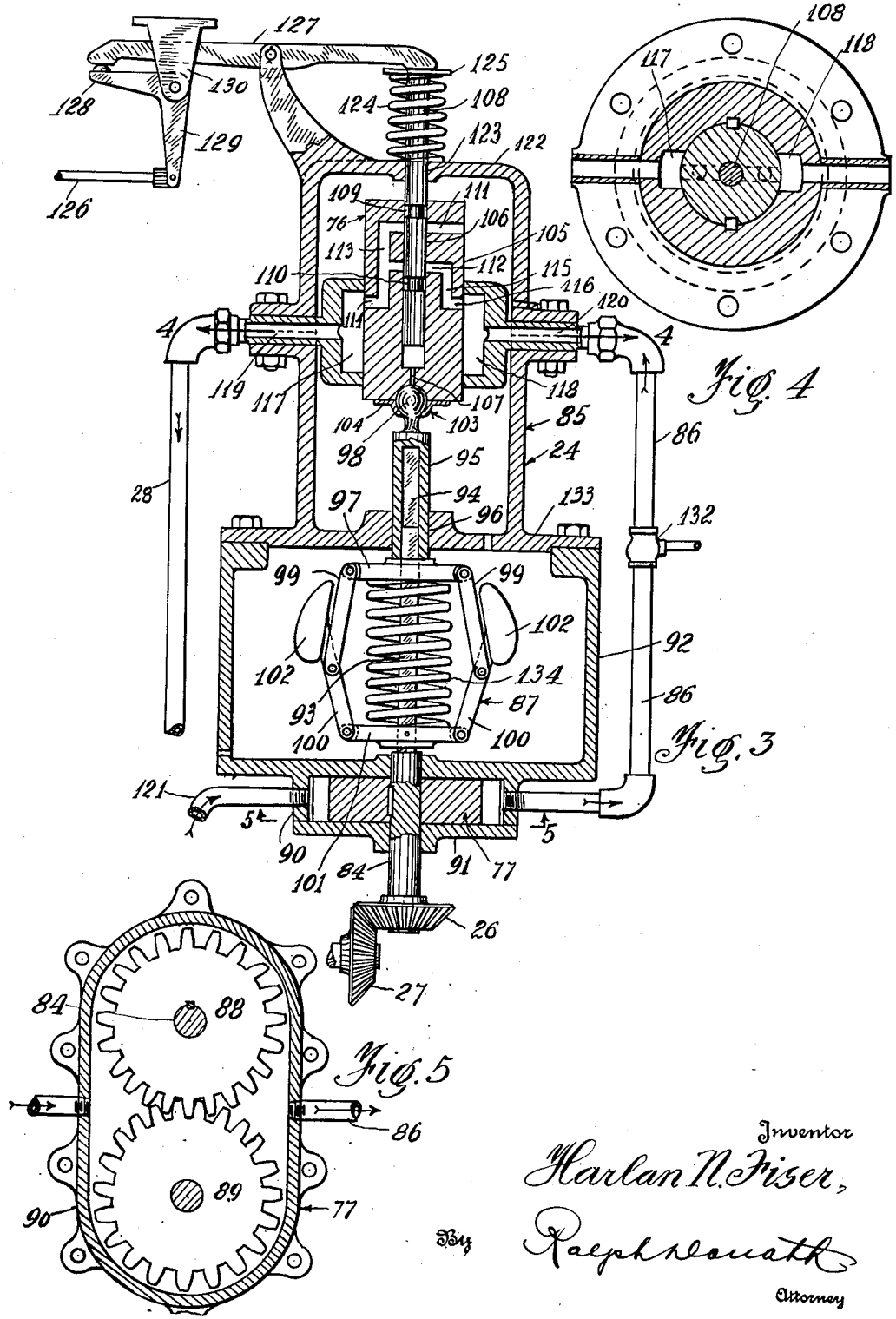

Inventor
Harlan N. Fiser
By Ralph Donath
Attorney

Patented May 27, 1952

2,598,367

UNITED STATES PATENT OFFICE 2,598,367

ROTARY HYDRAULIC COUPLING

Harlan N. Fiser, Pittsburgh, Pa.

Application November 10, 1948, Serial No. 59,207

6 Claims. (Cl. 60—54)

This invention relates to hydraulic coupling and more particularly to that class in which two bladed rotors emerged in thin oil or other suitable fluid are so arranged that one rotor is connected to and driven by the engine of a vehicle and the other rotor is connected to the driving wheels of the vehicle.

One of the objects of the invention is to provide a hydraulic coupling which replaces the conventional clutch and transmission in a motor vehicle and which is connected to a control unit by means of a high pressure fluid line.

Another object of the invention is to provide a hydraulic coupling for transmitting motion from one shaft to another, the respective speeds of the two shafts being variable; the transmission of motion from one shaft to the other being effected through the medium of a liquid.

Still another object of the present invention relates to a hydraulic coupling in which a pair of rotors are arranged for the purpose of obtaining a hydraulic transmission of power between a driving and a driven member arranged on two independent shafts.

Another object of the invention is to provide a hydraulic coupling wherein a driving rotor connected to the engine shaft is rotatably disposed within a driven rotor rotatably and slidably mounted on the driven shaft so as to transmit motion from the engine shaft to the driven shaft through the medium of a bath of liquid in which both rotors operate.

The invention has particular utility in connection with motor vehicles and the object of the same is to provide an apparatus of the character specified, the independent driving and driven members of which may be adapted to transmit motion from one shaft to another, the respective speeds of the two shafts being variable depending on the torque demand of the driven shaft.

Another object of the invention is to provide a new and improved hydraulic coupling which is simple in construction, positive in action and inexpensive to manufacture.

Other objects of the invention will become apparent from the following detailed description taken in connection with the accompanying drawings in which:

Figure 1 is a section through the longitudinal axis of the hydraulic coupling unit constructed according to the present invention.

Figure 2 is a section taken on line 2—2 in Figure 1.

Figure 3 is a section through the longitudinal axis of the control unit as used in this invention in connection with the hydraulic coupling unit shown in Figure 1.

Figure 4 is a section taken on line 4—4 in Figure 3.

Figure 5 is a section on line 5—5 in Figure 3.

Figure 6 is a section through the longitudinal axis of the driving rotor in accordance with this invention.

Figure 7 is a top view of Figure 6.

Figure 8 is a fragmentary cross-section of the control unit shown in Figure 3 illustrating the governor and its associated parts in engine overspeed condition.

Figure 10:
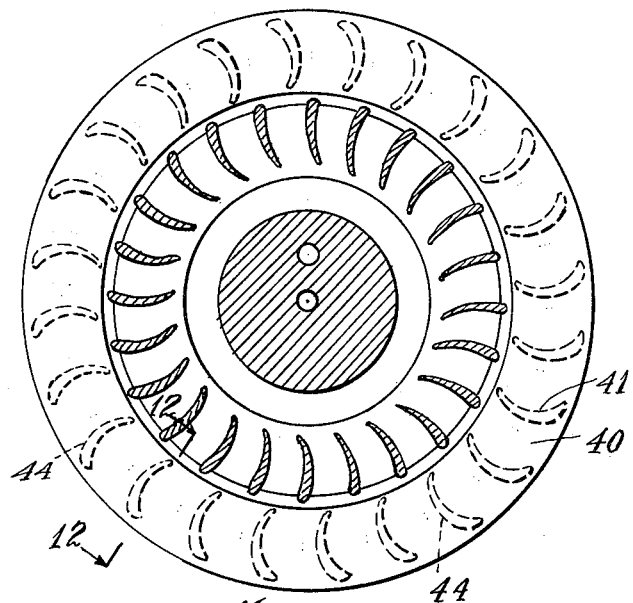
Figure 10 is a section on line 10—10 in Figure 1.

In the embodiment of the invention described herein I am using two rotors cooperating with each other and enclosed in a bath of thin oil or other suitable fluid in which one rotor is attached to and driven by the vehicle engine (not shown) hereafter named the impeller 21 and the other rotor is connected to the driving wheels of the vehicle, hereafter named the turbine 22. This turbine is mounted on a splined shaft 23 so that its relative position to the impeller 21 may be varied by means of the control unit 24 in order to vary the load that is imposed on the driving impeller 21.

In general the present invention consists of two basic units, the coupling unit 25 as best shown in Figure 1 and the control unit 24 as illustrated in Figure 3 of the drawings.

The hydraulic coupling 25 is intended to occupy the present place of the clutch and transmission in a conventional vehicle and the control unit 24 is to be mounted in a convenient place on the engine so that the driving gear 26 of the control unit 24 will be in mesh with the engine gear 27. The control unit 24 is connected to the hydraulic coupling unit 25 by means of a high pressure oil line 28 (Figures 1 and 3).

Referring now to Figure 1, the coupling unit 25 comprises an impeller 21 as shown integral with a shaft 29 which connects direct with the fly wheel 30 of the engine. The turbine 22, when in the full forward position completely surrounds the impeller 21.

Figures 9, 12:
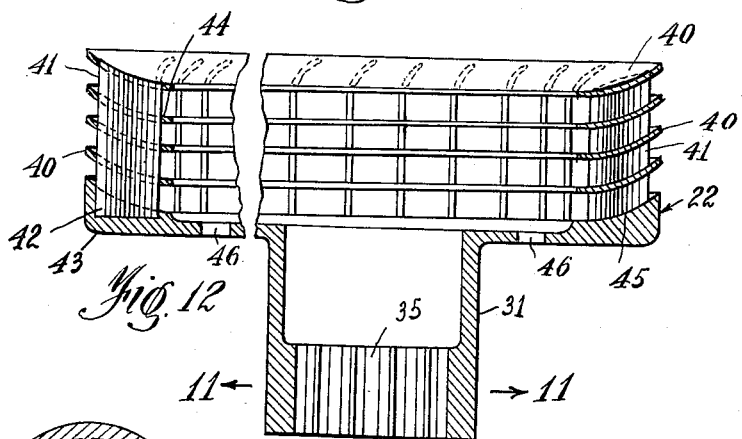
Figure 9 is a cross-sectional view of the driven turbine as used in this invention.
Figure 12 is a section on line 12—12 in Figure 10.
Figure 11:
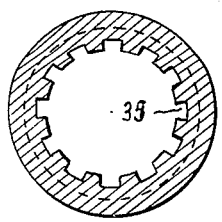
Figure 11 is a section on line 11—11 in Figure 9.

The turbine 22 includes an integral hub 31 which may be pressed or splined to the hollow sleeve 23. I have shown the turbine hub 31 splined to the sleeve 23 by providing the hub with interior splines 35 which interfit and are securely held in position by locking spring rings 33 and 34. The hollow sleeve 23 is closed at the forward end as indicated by the numeral 36 in Figure 1, and the rear end of that sleeve is provided with splines 37 which slidably engage splines 38 of propeller shaft extension 39. It will be noted that the turbin 22 comprises a plurality of annular, vertically and parallel disposed disc-rings 40 as best shown in Figures 1, 9, 10 and 12. These disc-rings 40 are connected together with a plurality of radialy disposed, inclined and curved vanes 41 in any desired manner, for instance, by providing slits the shape of which corresponds to the cross-section of the vanes after which the vanes are driven in place and peened or welded to the disc-rings 40. The inner ends 42 of the vanes 41 are secured into the hub-ring 43 by providing slits 44 which conform to the shape of the vanes 41 and driven into position or welded. The front face 45 of hub-ring 43 is preferably machined to a smooth curvature similar to the one shown for disc-rings 40. Holes 46 are provided in the hub ring 43 to permit fluid to flow freely from one side thereof to the other in order to prevent entrapment of fluid on either side and thereby retard the movement of the hub ring.

The impeller 21 includes a shaft 29 which merges into an outwardly curved body 47 which is provided with integral arms 48 connecting a ring of ovate cross-section indicated by the numeral 49 in Figure 6. Parallelly disposed and equally spaced rings 50 of curved cross-section are held in position by the curved vanes 51 in a similar manner as the vanes 41 for the turbine 22 but it will be noted that the vanes 51 slightly extend beyond the periphery of the rings 50. The outwardly curved body 47 has a central hub 52 which is provided with a cylindrical cavity 53 adapted to slidingly engage the closed end 36 of the hollow sleeve 23.

The impeller 21 and the driven turbine 22 are enclosed in a split housing 54 in which the portion 55 of the housing adjacent the fly wheel 30 of the engine is provided with a bearing 56 which abuts the shoulder 57 and surrounds the reduced portion 58 of impeller shaft 29. The inner face 59 of said portion 55 as well as the inner face of the portion 61 of the housing 54 is preferably made in one sweep with the curved body 47 of the impeller 21 so as to form an approximately globular inner face when both portions 55 and 61 of the split housing 54 are assembled. Portions 55 and 61 are provided with opposing flanged ends 62 and 63 respectively and held together with bolts 64. Housing 54 is provided with a water jacket 65 which is supplied with circulating cooling water from the radiator of the engine by usual hose connections (not shown).

Portion 55 is provided with a suitable recess 66 to accommodate the engine fly wheel 30 and the end 67 of the crankshaft 68 of the engine (not shown) on which is secured the flywheel gear 69 which meshes with the internal teeth 70 of the flywheel 30.

Low pressure oil from the engine enters the torque converter unit 25 through pipe 71 (Figure 1), hole 72 into circular groove 73 of bearing 56 and thence through the hole 74 in the reduced part 58 of shaft 29 into the cavity 53 of hub 52. The oil in the cavity 53 exerts pressure against the closed end portion 36 of sleeve 23 thereby forces the sleeve 23 including the turbine 22 towards the inner face 131 of the end wall 75 of housing 54, except when the control valve 76 of the control unit 24 (Figure 3) opens the high pressure oil line and the high pressure oil from the high pressure pump 77 in the control unit 24 enters the torque converter unit 25 by way of pipe line 28 (Figure 1), parts 78, 79 and 80. The pressure then exerted against the interior pocket 81 (Figure 1) of closed end 36 of sleeve 23 overcomes the lower pressure pocket 82 between the closed end 36 and the cylindrical cavity 53 of central hub 52 which forces the sleeve 23 and the turbine 22 forward.

When power is applied to shaft 29, the impeller 21 imparts a circular motion to the liquid which substantially fills the tightly sealed housing 54, in addition the centrifugal force of impeller 21 causes more or less liquid to be directed through the blades 41 of the turbine 22, depending on the relative longitudinal, axial position of the turbine 22.

As has been heretofore explained, the impeller 21 is mounted for rotary movement only while the turbine 22 is arranged concentrically with the impeller 21 and mounted for rotary and longitudinal, axial movement. By this arrangement the turbine 22 surrounds the periphery of the impeller 21, more or less, as determined by the control unit 24 thereby causing that more or less fluid may be received by the turbine 22 which absorbs its kinetic energy and causes the turbine 22 to rotate. In addition to the circular flow of the fluid about the longitudinal centerline, indicated by the numeral 83 within the housing 54 there also exists a vortex flow which causes the fluid not absorbed by the turbine 22 to still retain its kinetic energy by re-entering the impeller 21 to produce a hydraulic coupling action. It is the relative position of the turbine 22 and the impeller 21 which determines the amount of kinetic energy absorbed and therefore determines the load imposed upon the engine.

Referring now to the control unit 24 (Figure 3) which controls the coupling unit 25 (Figure 1), the same consists of a central shaft 84 that is geared by bevel gears 26 and 27 to the engine (not shown). Mounted on said shaft is a gear type high pressure pump 77 which receives engine oil under pressure from an oil pump (not shown) of the lubricating system of the engine and delivers it to the control valve assembly 85 at high pressure by means of the pipe connections 86. In general, this control unit 24 consists of a high pressure gear pump 77, a control valve 76 and a centrifugal governor 87.

The high pressure gear pump 77 consists of a pair of spur gears 88 and 89 in which gear 88 is mounted on a shaft 84 while gear 89 idles. Both gears are mounted in a suitable gear-housing 90 (provided with a cover 91) which has formed integrally therewith a governor casing 92. Shaft 84 is provided with a square extension 93, the upper end of which slidingly penetrates into an elongated, square aperture 94 of the sleeve member 95. This sleeve member is slidably and rotatbly mounted in bore 96 of cover 133 and is provided at one end with an integral disc 97 and at the opposite end with an integral ball 98. Disc 97 is adapted to receive the upper links 99 of a governor 87 while the lower links 100 are similarly attached to a disc 101 which is rigidly attached to shaft 84. A weight 102 is securely attached to the free end of each link 100 in any suitable manner.

It will be noted that the governor 87 illustrated in Figure 8 shows the weights 102 flown outwardly by centrifugal force caused by the engine (not shown) which rotates shaft 84 by means of bevel gears 26 and 27.

The lower end of the control valve 76 is shown with a ball and socket connection 103 in which the ball end 98 of sleeve member 95 is held for universal rotation by a socket 104 shown in Figures 3 and 8. Control valve 76 comprises a cylindrical member 105 having a central aperture 106 adapted to receive the valve stem 108 and terminating at the bottom into a reduced aperture 107 which serves mainly to oil the ball end 98 of the ball and socket connection 103. Spaced apart circular grooves 109 and 110 are provided in valve stem 108 which cooperate with horizontal ports 111 and 112 respectively of cylindrical member 105. Vertical port 113 connects ports 111 and 112 and terminates in horizontal port 114 while vertical port 115 connects horizontal port 112 with horizontal port 116. Port 114 leads to port 117 thence to hole 119 and to pipe connection 28, port 78 in coupling unit 25. Port 116 leads to port 118, hole 120, pipe connection 86 to high pressure pump 77 (Figures 3 and 5). The numeral 121 (Figure 3) indicates inlet pipe connection from engine oil pump (not shown).

The pilot control 76 is encased by a cap 122 which is provided with a central aperture 123 through which the valve stem 108 of control valve 76 penetrates and extends outwardly a sufficient distance to accommodate effectively a coil spring 124 and is held in position by a flat disc or washer 125 secured to the end of valve stem 108 in any suitable manner.

Figure 3 illustrates the control unit 24 in which the control valve 76 and governor 87 are in neutral position while Figure 8 shows the control unit 24 in which the control valve 76 and governor 87 are in engine overspeed position.

The control unit is manipulated by the operator of the vehicle by the usual accelerator (not shown) connected by suitable linkages 126 (Figure 3) which cooperate with a pivot bar 127, one end of which contacts the top of the valve stem 108 while the other end contacts the end 128 of a bell-crank lever 129 pivotally supported on a bracket 130.

It is assumed that as the engine speeds up the governor weights 102 of governor 87 are thrown outwardly (Figure 8) thereby causing the control valve 76 to be pulled downwardly and as the throttle is opened by the operator the valve stem 108 is forced downwardly to a position that corresponds to the throttle setting. Since there is a certain engine R. P. M. for each throttle setting at which the engine operates most efficiently, the action of governor 87 and the position of control valve 76 in relation to the position of valve stem 108 determines the speed of the engine for each position of the throttle. Regardless of the position of the valve stem 108 in control valve 76, when the engine R. P. M. is too low for a particular power setting the action of the governor 87 allows the control valve 76 to move upwards thereby causing the upper annular groove 109 of valve stem 108 to open the upper port 111 in the pilot valve. This allows the high pressure fluid to escape from pocket 81 (Figure 1) through ports 80, 79, 78, high pressure fluid line 28, ports 119, 117, 114, 113 and 111. The lower pressure fluid in pocket 82 forces the sleeve 23, which is attached to the turbine 22 by spring locking ring keys 33 and 34 rearwards which causes the load on the engine to decrease thereby permitting the R. P. M. to increase until the governor 87 pulls the control valve 76 sufficiently downward to stop the flow of fluid through the control valve by closing the upper annular groove 109 of valve stem 108

When the engine overspeeds the opposite happens, the control valve 76 is pulled downwardly from the neutral position (Figure 3) and the lower annular groove 110 in valve stem 108 connects the high pressure line 86 from the high pressure pump 77 through hole 120, port 118, port 116, groove 110, ports 114, 117, hole 119, high pressure pipe line 28, ports 78, 79 and 80, pocket 81 and forces the sleeve 23 on the turbine 22 forward, thus increasing the load on the engine and consequently slowing down the engine R. P. M. until the control valve 76 again reaches the neutral position with valve stem 108 as shown in Figure 3. Numeral 132 in Figure 3 in high pressure line 86 indicates a conventional pressure regulator by-pass valve.

The operation of the above described hydraulic coupling is very simple when explained in terms of kinetic energy. The impeller 21, by causing the fluid to whirl about the longitudinal axis of the converter, imparts kinetic energy to the fluid in proportion to the R. P. M. of the engine. The turbine 22 absorbs any portion of this kinetic energy by virtue of its longitudinal position in relation to the impeller, therefore, this system gives a hydraulic coupling unit that is capable of providing an extremely high range of torque ratios. Due to the automatic action of the control unit in general the turbine 22 will automatically increase or decrease the load on the engine so that the engine will constantly retain a certain R. P. M. within a narrow range of variation for any power setting. This removes the danger of overloading an engine for any power setting, thus lessening the danger of detonation in the engine, therefore, safely allowing an increase in the engine compression ratio.

I claim:

1. A hydraulic coupling comprising a rotor, means for rotating said rotor, an annular peripheral chamber formed in said rotor defined by the body of the rotor and a ring of ovate cross section fixed to the rotor at spaced apart points, a plurality of annular spaced apart rings for directing hydraulic fluid, said rings being spaced between the body of the rotor and the ovate ring, said rings having outer edges terminating on a common line substantially parallel to the axis of the rotor and inner edges terminating on a common line intermediate the rotor axis and the outer edges and substantially parallel thereto, a plurality of curved vanes transverse to said rings and attached thereto and to the body of the rotor and the ovate ring for impelling hydraulic fluid, fluid receiving means slidably surrounding the rotor, said fluid receiving means receiving fluid from the rotor and being driven thereby, and means for sliding the fluid receiving means.

2. A hydraulic coupling comprising a rotor means for rotating said rotor, an annular peripheral chamber formed in said rotor and defined by the body of the rotor and a ring of ovate cross section fixed to the rotor at spaced apart points, a plurality of parallel and equally spaced apart annular rings for directing hydraulic fluid, said rings being spaced between the body of the rotor and the ovate ring, said rings having outer edges terminating on a common line substantially parallel to the axis of the rotor and inner edges terminating on a common line intermediate the rotor axis and the outer edges and substantially parallel thereto, a plurality of parallel and equally spaced apart curved vanes transverse to said rings and attached thereto and to the body of the rotor and to the ovate ring for impelling hydraulic fluid, fluid receiving means slidably surrounding the rotor, said fluid receiving means receiving fluid from the rotor and being driven thereby and means for sliding the fluid receiving means.

3. A hydraulic coupling comprising a rotor, means for rotating the rotor, an annular peripheral chamber formed in said rotor and defined by the body of the rotor and a ring of ovate cross section fixed to the rotor at spaced apart points, a plurality of parallel and spaced apart annular rings for directing hydraulic fluid, said rings being spaced between the body of the rotor and the ovate ring, said rings having outer and inner edges terminating in a pair of substantially parallel lines which are substantially parallel to the axis of rotation of the rotor, a plurality of substantially parallel spaced apart curved vanes transverse to said rings and attached thereto and to the body of the rotor and the ovate ring for impelling hydraulic fluid, fluid receiving means slidably surrounding the rotor and receiving fluid therefrom and being driven thereby, said fluid receiving means including a plurality of spaced apart disc rings of arcuate cross section, a plurality of radially disposed vanes of curved cross-section transverse to said disc rings and attached thereto, said vanes being of substantially equal size and area, and means for sliding the fluid receiving means.

4. A hydraulic coupling as claimed in claim 3 in which the rotor has a cylindrical bore in its hub and the fluid receiving means is attached to a sleeve around the axis of the rotor, said sleeve being slidably and rotatably mounted in the rotor bore and operatively connected to a shaft having a central bore, said central bore opening into the sleeve to deliver fluid to the sleeve to cause it to slide axially, a port through the hub of the rotor for delivering fluid to the cylindrical bore in the rotor externally of the sleeve and means for delivering fluid to the central bore of the shaft and to the port of the rotor.

5. A hydraulic coupling as claimed in claim 3 having fluid control means for sliding the fluid receiving means, said fluid control means being operatively connected to the means for rotating the rotor and including a fluid operated sleeve fixed to the fluid receiving means, a fluid pump for delivering fluid to the sleeve, a control valve between the pump and the sleeve regulating the flow of fluid and governor means driven by the means for rotating the rotor actuating the control valve.

6. A hydraulic coupling as claimed in claim 3 in which the rotor has a cylindrical bore in its hub and the fluid receiving means is attached to a sleeve around the axis of the rotor, said sleeve being slidably and rotatably mounted in the rotor bore and operatively connected to a shaft having a central bore, said central bore opening into the hollow sleeve to deliver fluid to the sleeve to cause it to slide axially, a port through the hub of the rotor for delivering fluid to the cylindrical bore in the rotor externally of the sleeve and fluid control means delivering fluid to the sleeve, said fluid control means being operatively connected to the means for rotating the rotor and including a fluid pump, a control valve between the pump and the sleeve regulating the flow of fluid and governor means driven by the means for rotating the rotor actuating the control valve.

HARLAN N. FISER.

REFERENCES CITED

The following references are of record in the file of this patent:

UNITED STATES PATENTS

| Number | Name | Date |
|---|---|---|
| 1,327,080 | Brown | Jan. 6, 1920 |
| 1,672,232 | Saives | June 5, 1928 |
| 1,904,054 | Kiep et al. | Apr. 18, 1933 |
| 2,384,841 | Lang et al. | Sept. 18, 1945 |
| 2,392,520 | Benz et al. | Jan. 8, 1946 |
| 2,395,047 | Hanson | Feb. 19, 1946 |